(12) United States Patent
Anderson

(10) Patent No.: US 8,525,480 B2
(45) Date of Patent: Sep. 3, 2013

(54) METHOD AND SYSTEM FOR CHARGING A VEHICLE HIGH VOLTAGE BATTERY

(75) Inventor: Richard Dyche Anderson, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 287 days.

(21) Appl. No.: 12/979,630

(22) Filed: Dec. 28, 2010

(65) Prior Publication Data

US 2012/0161698 A1 Jun. 28, 2012

(51) Int. Cl.
*H01M 10/44* (2006.01)
*H01M 10/46* (2006.01)

(52) U.S. Cl.
USPC .................................................. 320/132

(58) Field of Classification Search
USPC ................ 320/107, 112, 132, 149, 150, 160, 320/103, 104
See application file for complete search history.

(56) References Cited

U.S. PATENT DOCUMENTS

| 5,696,367 | A | | 12/1997 | Keith | |
|---|---|---|---|---|---|
| 5,952,813 | A | | 9/1999 | Ochiai | |
| 6,037,751 | A | * | 3/2000 | Klang | 320/160 |
| 2006/0232238 | A1 | * | 10/2006 | Horii | 320/104 |

FOREIGN PATENT DOCUMENTS

| JP | 201060300 A | 3/2010 |
|---|---|---|
| WO | 2010035676 A1 | 4/2010 |

* cited by examiner

*Primary Examiner* — Edward Tso
(74) *Attorney, Agent, or Firm* — Brooks Kushman P.C.; David B. Kelley

(57) ABSTRACT

A method and a system for charging a battery in hybrid vehicles and electric vehicles are provided. An amount of energy consumption for charging a battery is calculated by taking the sum of a first amount of energy for charging a high voltage battery and a second amount of energy for use by a low voltage auxiliary system during charging. An optimal charge current for a charger is determined based on a charging option. The charging option provides a set of desired charging parameters for a charger controller. A state of charge of the battery is determined within a state of charge range. The charger controller provides a charge current to the battery. The charge current is the optimal charge current up to a maximum charge current for the state of charge range of the battery.

21 Claims, 4 Drawing Sheets

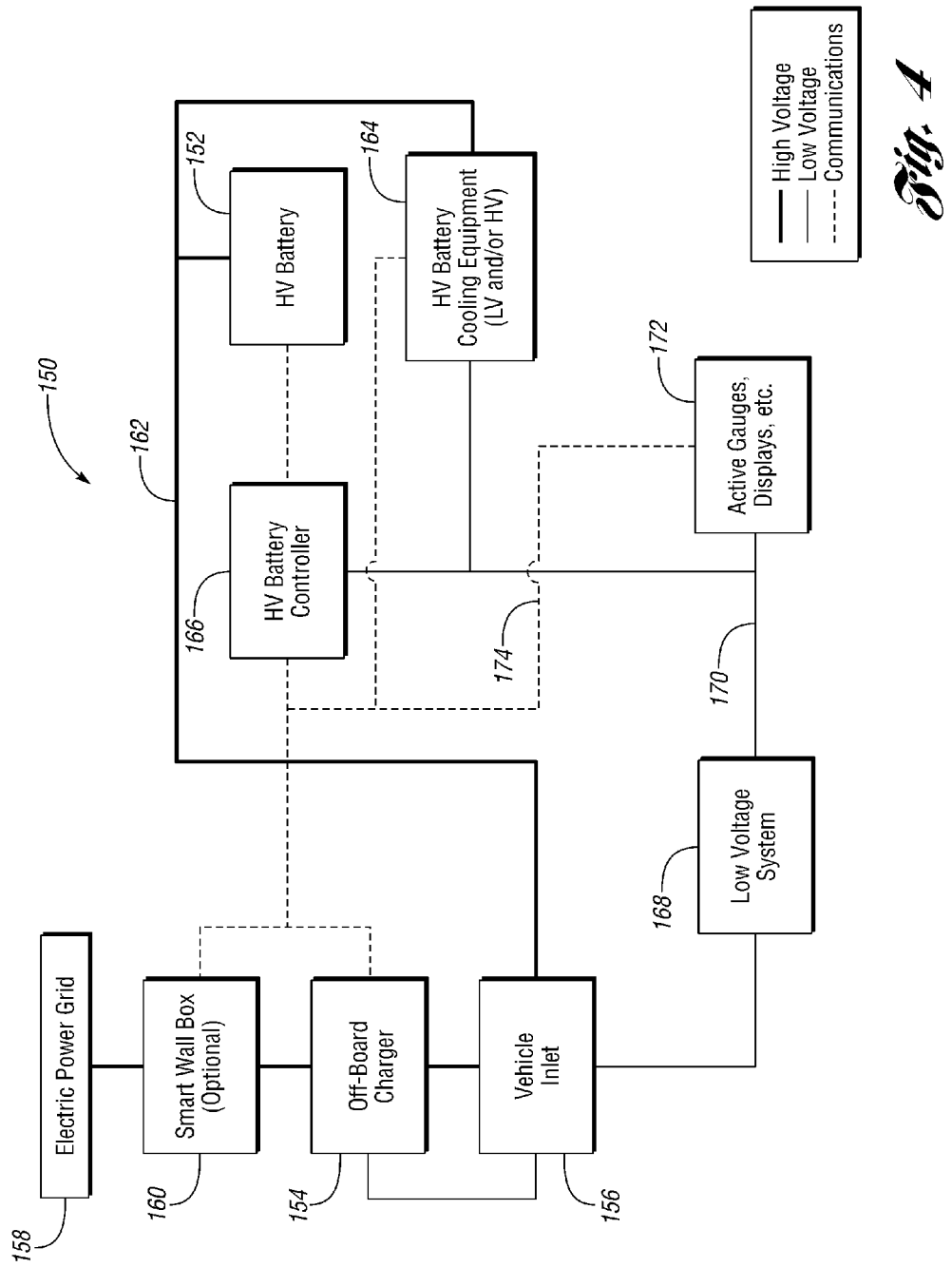

METHOD AND SYSTEM FOR CHARGING A VEHICLE HIGH VOLTAGE BATTERY

BACKGROUND

1. Technical Field

Various embodiments relate to methods and systems for charging a vehicle high voltage battery.

2. Background Art

Batteries are used in hybrid vehicles and electric vehicles for energy storage and as a power source. High voltage batteries are used to provide electric power for electric motors which are used in the vehicles to drive the wheels.

In a hybrid vehicle, the battery is connected to an electric machine arranged in parallel or in series with another power source, such as an engine. In either a hybrid vehicle or an electric vehicle, the battery provides power for the electric machine to act as a motor to provide torque, and in some cases the battery may be recharged by the electric machine acting as a generator.

Many hybrid and electric vehicles are now provided with a "plug in" option, which allows the user of a vehicle to connect the vehicle battery to an external power source to charge the battery. Charging typically occurs at full power, or the fastest rate the battery can accommodate. The chargers may additionally have a trickle charge available.

SUMMARY

In an embodiment, a method for charging a battery in hybrid vehicles and electric vehicles is provided. The method includes calculating an amount of energy consumption for charging a battery by taking the sum of a first amount of energy for charging a high voltage battery and a second amount of energy for use by a low voltage auxiliary system during charging. The optimal charge current is determined for a charger based on a charging option. The charging option provides a set of desired charging parameters for a charger controller. A state of charge of the battery is determined within a state of charge range. The charger controller provides a charge current to the battery, whereby the charge current is the optimal charge current up to a maximum charge current for the state of charge range of the battery.

In another embodiment, a battery charging system for an electrically powered vehicle has a rechargeable high voltage battery. The system is provided with a battery charger adapted to provide a charge current to the battery, and a battery controller to determine an optimal charge current that represents a minimized amount of energy consumption to operate an auxiliary system while charging the battery.

In yet another embodiment, a method for charging a vehicle battery includes determining an optimal charge current to minimize the amount of energy consumption by a battery, and charging the battery at the optimal charge current up to a maximum charge current for the battery.

BRIEF DESCRIPTION OF THE DRAWINGS

FIG. 4 is a schematic of an off-board battery charging system according to an embodiment.

DETAILED DESCRIPTION

As required, detailed embodiments of the present invention are disclosed herein. It is to be understood, however, that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
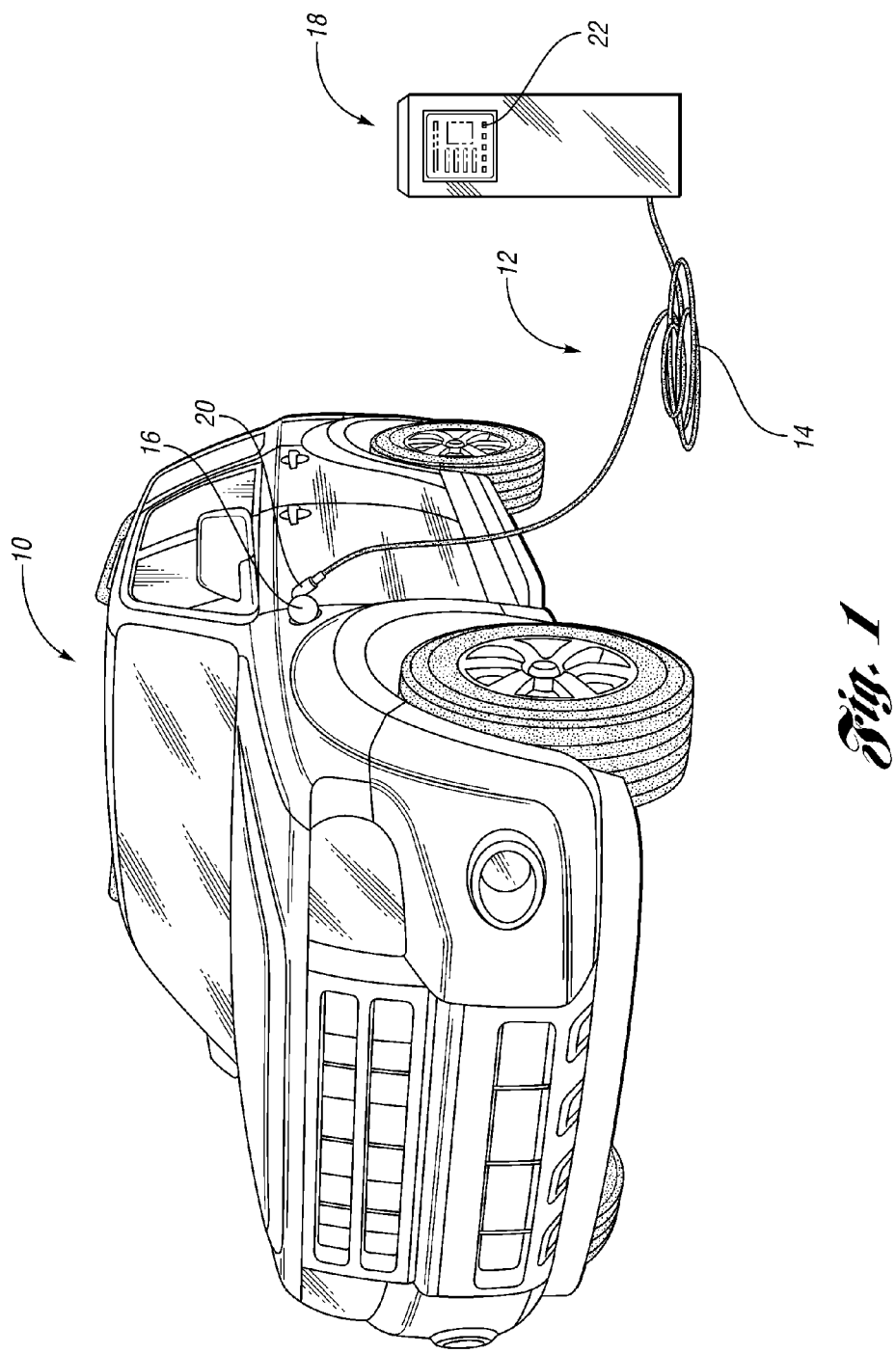
FIG. 1 is a perspective view of a vehicle charging at a charging station according to an embodiment.

FIG. 1 illustrates an embodiment of a hybrid vehicle or electric vehicle 10 with the battery being charged using a "plug-in" system 12. A cord 14 is used to connect the power input or port 16 on the vehicle 10 to a charging system 18. The cord 14 typically has an adapter 20 to connect the cord 14 to the vehicle power input 16.

The external charging system 18 is connected to the electric power grid or another source of energy. In one embodiment, the external charging system 18 has a user interface 22 to display information or data to a user and to allow for selection of various options or for user inputs to the system. The interface 22 may be a liquid crystal display (LCD) with a touch-screen or with various buttons as inputs.

In other embodiments, the charging system is positioned within the vehicle 10 as an on-board system. The cord 14 is external to the vehicle 10 for connection to an outlet or other electrical power source. The adapter 20 allow for removal from the input 16 and storage of the cord 14, or the cord 14 may be connected to the input 16 with the addition of a take-up reel or other storage mechanism. With an onboard system, the user interface 22 may be integrated into the vehicle information display system in the vehicle 10 interior.

Figure 2:
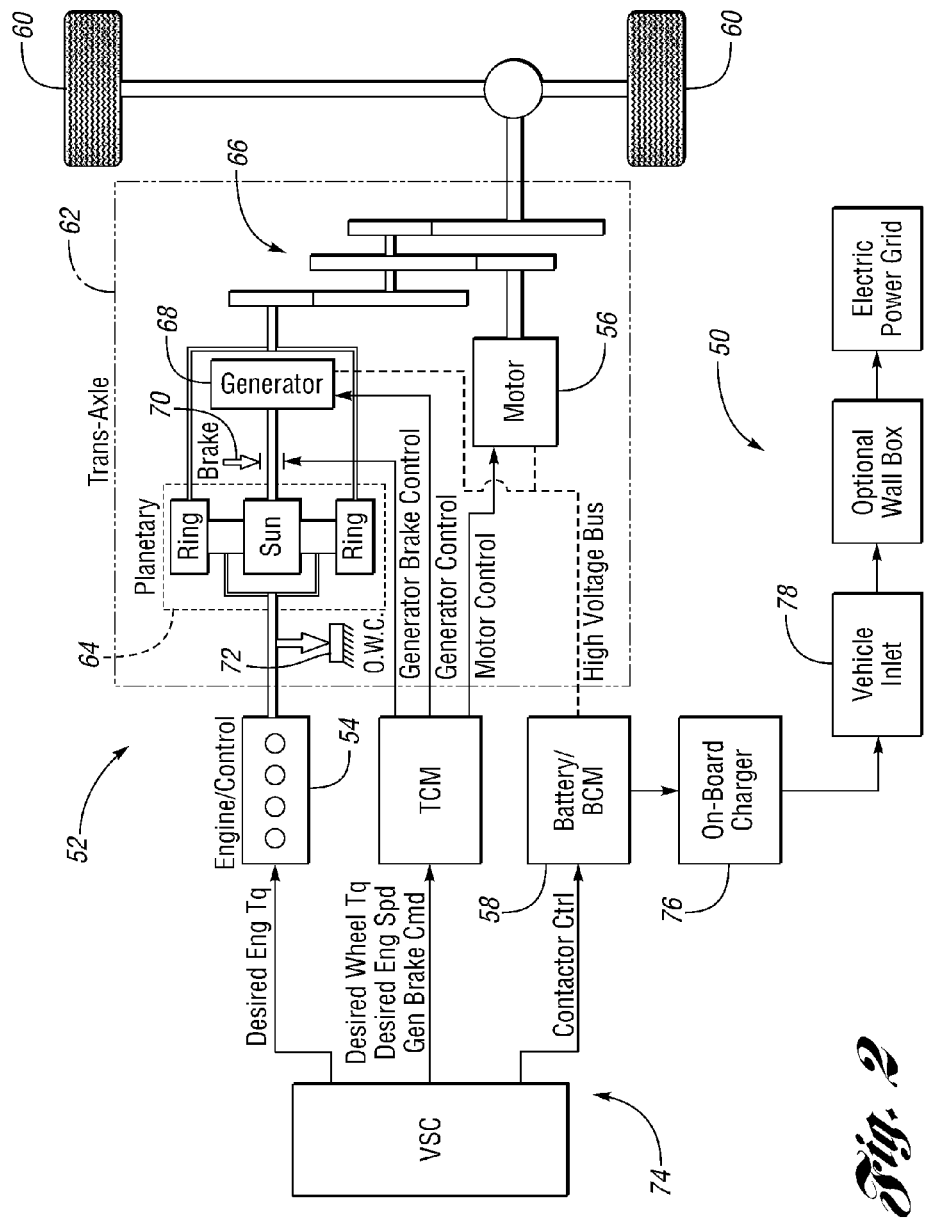
FIG. 2 is a schematic of a vehicle powertrain and charging system according to an embodiment.

FIG. 2 illustrates an onboard charging system 50 with a hybrid vehicle powertrain 52 according to an embodiment. The powertrain 52 may have any suitable configuration, such as a series drive, split hybrid drive, dual mode split, or pure electric drive, as known in the art. In the embodiment in FIG. 2, a power split drive configuration is shown having a first power source 54 and a second power source 56, such as, respectively, an engine 54 and an electric machine 56 with a battery 58. Other power sources are also contemplated. The engine 54 may use gasoline, diesel, ethanol, hydrogen, or other combustible fuels as are known in the art. Of course other powertrain systems for hybrid or electric vehicles as are known in the art may be used with the charging systems and methods described herein. For example, the powertrain 52 may be a battery electric powertrain without an engine 54, where the electric machine 56 and battery 58 are the sole power source for the vehicle. In this case, the battery 58 could be charged by the electric machine in a regeneration drive mode, or it could be charged using a plug-in system.

The engine 54 and the electric machine 56 are arranged in parallel and connected to the driving wheelset 60 of a vehicle using a power transfer system 62. Of course, in other embodiments, either the engine 54 or the electric machine 56 may be configured to drive the wheelset 60, while the other drives a second wheelset (not shown).

The power transfer system 62 may include various mechanical, electrical, and/or electromechanical devices. In the embodiment shown in FIG. 2, the power transfer system 62 includes a planetary gear unit 64, a first electrical machine 56, power transfer gearing 66, and a second electrical machine 68 as primary components. The planetary gear unit 64 may have any suitable configuration. In the embodiment shown, the planetary gear unit 64 includes a sun gear, a plurality of planet gears, and a ring gear. The planetary gear unit 64 transfers power in a split power flow path to wheel set 60. A first path is mechanical and a second path is electromechanical. Sun gear reaction torque drives machine 68 or it acts as a generator to charge the battery 58 and power motor 56. Power delivered through each path is combined by gearing 66 to drive wheel set 60 in forward drive.

As shown in FIG. 2, the first electric machine 56 is powered by the battery 58 and is coupled to the power transfer gearing 66 to propel the wheelset 60 of the hybrid vehicle.

The second electric machine 68, which may be a motor-generator, is coupled to the sun gear of the planetary gear unit 64 to provide reaction torque for the engine 54 during split power delivery. A brake 70 may be used to provide reaction torque for the engine 54 during parallel drive when both mechanical power and electric power are delivered to traction wheels 60. Overrunning coupling 72 provides reaction torque for the electric machine 68 during generator drive as the electric machine 68 acts as a motor. A control area network 74 has multiple control modules for controlling the system 52 including the battery controls, engine controls, trans-axle controls, and regenerative braking controls.

The control area network 74 communicates with the engine 54, battery 58, and electric machines 56, 68, to monitor and control their operation and performance. The control area network 74 receives signals such as those indicative of engine speed, engine torque, vehicle speed, electric machine speed, electric machine torque, and operational state of the battery 18, from various sensors.

An on-board charger 76 positioned within the vehicle is electrically connected to the battery 58 and to a vehicle inlet 78. The vehicle inlet 78 is electrically connected to the electric power grid 80 using a cord. A wall box 82 for a user display or interface is used with the system 50 in an embodiment.

In one embodiment, the battery 58 is sized larger for a plug-in vehicle than for a non plug-in traditional hybrid. The battery 58 may be on the same high voltage bus or on a high voltage bus separate from the other (non-battery) components. The charger may also be on a separate high voltage bus. Alternatively, the charger may be on the same high voltage bus as the other high voltage components in the vehicle.

Figure 3:
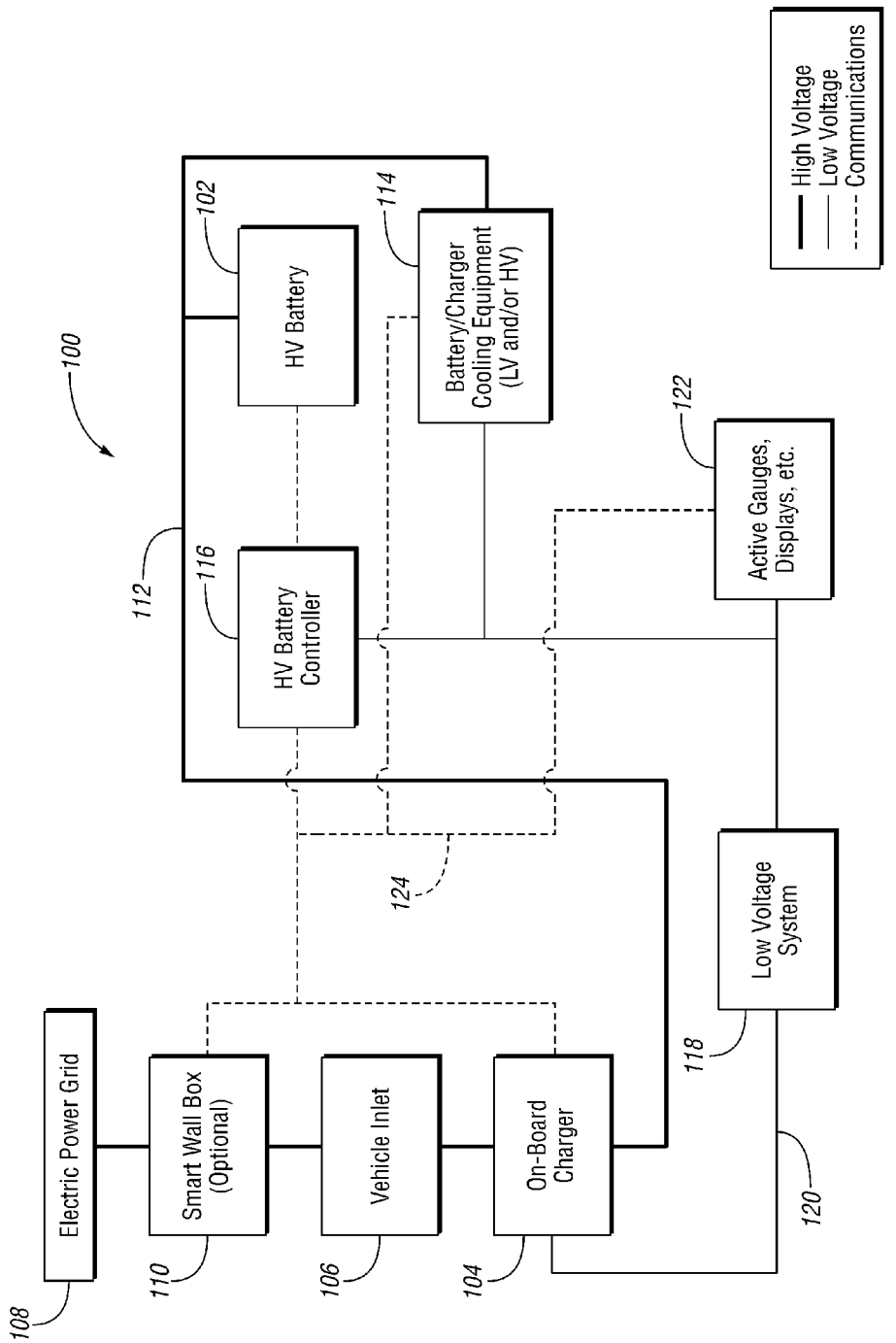
FIG. 3 is a schematic of an on-board battery charging system according to an embodiment.

A schematic of an embodiment of an on-board charging system 100 is shown in FIG. 3. The high voltage battery 102 is used in a vehicle powertrain such as those described previously for a plug-in electric of hybrid vehicle. The battery 102 may be a lithium family battery (lithium-ion, Li-ion polymer, lithium iron phosphate, or the like), a nickel cadmium battery, a nickel metal hydride battery, a zinc air battery, a lead-acid, or the like.

In one embodiment, the battery 102 and charging system 100 operate under SAE Level 2 standards, which are defined as alternating current (AC) single phase between approximately 208-240 volts with a maximum continuous current of thirty-two amps continuous. Of course, other electrical standards are contemplated. In another embodiment, the battery 102 and charging system 100 operate under level 2+ standards, which increase the maximum current to eighty amps with 208-240 volts. This increase in current allows for a higher charge rate, leading to faster charging of the battery 102, but potentially higher energy usages.

The battery 102 is connected to an on-board charger 104 using a high voltage connection 112. The on-board charger 104 is connected to the vehicle inlet 106, which in turn is connected to the electrical power grid 108. The electric power grid may provide 240 volts. A wall unit 110 may be provided and positioned between the power grid 108 and the inlet 106. The high voltage connections 112 allow for a high voltage flow of electricity to reach the battery 102 for charging.

The battery 102 and or charger 104 may require a cooling system 114 to prevent overheating of the equipment during charging. The cooling system 114 may be a high voltage or a low voltage system.

A battery controller 116 is in communication with the battery 102 to determine the state of charge, temperature, and the like. The battery controller 116 is connected to the charger 104 to receive power through a low voltage system 118 and low voltage connections 120. The low voltage system 118 is also connected to an auxiliary system 122, which may include the vehicle HVAC, gauges, displays, and other vehicle functions requiring power. The low voltage system may also provide power to the cooling system 114 if it is a low voltage one.

The battery controller 116, battery 102, cooling equipment 114, charger 104, and auxiliary system are linked by communication connections 124. A wall unit 110 is also linked into the communication connections 124 if one is provided. This allows the user to provide inputs into and receive information from the charging system and for the charging system to manage the various subsystems.

FIG. 4 illustrates an embodiment of an off-board charging system 150, which includes a high voltage battery 152 for use with a plug-in electric or hybrid vehicle powertrain such as those described previously.

The battery 152 is connected to a vehicle inlet 156 and in turn to an off-board charger 154 using a high voltage connection 162. The off-board charger 104 is connected to the electrical power grid 158. A wall unit 160 may be provided and positioned between the power grid 158 and the off-board charger 154. The high voltage connections 162 allow for a high voltage flow of electricity to reach the battery 152 for charging.

A cooling system 164 prevents overheating of the equipment during charging. The cooling system 164 may be a high voltage or a low voltage system.

A battery controller 166 is in communication with the battery 152 to determine the state of charge, temperature, and the like. The battery controller 166 is connected to the inlet 156 to receive power through a low voltage system 168 and low voltage connections 170. The low voltage system 168 is also connected to an auxiliary system 172, which may include the vehicle HVAC, gauges, displays, and other vehicle functions. The low voltage system may also provide power to the cooling system 114 if it is a low voltage one. The off-board charger 154 converts a portion of the high voltage power from the electrical grid 158 to provide a low voltage supply of power to the inlet 156 and low voltage system 168.

The battery controller 166, battery 152, cooling equipment 164, charger 154, and auxiliary system 172 are linked by communication connections 174. A wall unit 160 is also linked into the communication connections 174 if one is provided. This allows the user to provide inputs into and receive information from the charging system and for the charging system to manage the various subsystems.

The battery controller 116, 166 shown in FIGS. 3 and 4, respectively, can request a charge level from the charger 104, 154. The charge level is typically to control to a desired current or a request to draw as much power as the charger can provide to the battery. There may also be interfaces with the wall unit 110, 160 or the power company through the wall unit.

The battery controller 116, 166 can interface with the wall unit or with another user interface, such as a vehicle display system or a remote device in wireless communication with the charging system, such as a cell phone, to allow for a user to select a charging option from the charging system. The charging options include minimum energy consumption to charge, minimum time to charge, charging at a specified time of day for a given rate, minimum cost charging, minimum energy to complete charging by a given time, minimum cost charging for the minimum amount of energy given a time constraint, or the like. The charging system may have a default option, such as minimum energy consumption to charge.

If the energy used to charge the battery can be minimized, the user may be able to save money, improve the label fuel economy of the vehicle, and potentially reduce demand on the electrical grid. The amount of energy required to charge the battery varies with the rate at which energy is drawn from the wall. This can be attributed to several reasons. One is that the higher the charge current, the higher the battery voltage, and since charge is conserved during battery charging and not energy, more energy is required to charge the battery. Another reason is that high charge currents result in shorter charge times, meaning the low voltage electrical loads with the auxiliary system that power controllers, contactors, fans, and the like do not need to operate for a long period of time. Another reason arises in some high battery systems, where electronic sensors for the measurement of the system may be powered by the high voltage battery itself; and since these circuits can be turned off when the charging is complete, a high charge current reduces the energy required to power these circuits.

In order to minimize energy consumption by the battery during a charging operation, the system will determine the charge current which minimizes energy consumption. The system may also determine how to interact with the user to allow the selection of an energy efficient option or another charging option, and account for the choice of the user with respect to auxiliary devices such as vehicle cabin pre-heat or pre-cool. Vehicle cabin pre-heat and pre-cool is another auxiliary system function with the HVAC system of the vehicle that conditions the air in the vehicle interior while charging and before use of the vehicle.

The minimum energy consumption may be calculated as follows. The amount of energy used to charge the battery is:

$$E_{HV} = \int V_{HV} I_{HV} dt \quad (1)$$

where $E_{HV}$ is the amount of high voltage energy used to charge the battery, $V_{HV}$ is the high voltage of the battery, $I_{HV}$ is the high voltage current.

The amount of energy used by the low voltage system during charging is:

$$E_{LV} = \int V_{LV} I_{LV} dt = \int P_{LV} dt \quad (2)$$

where $E_{LV}$ is the amount of low voltage energy used in charging the battery, $V_{LV}$ is the low voltage, $L_{LV}$ is the low voltage current, and $P_{LV}$ is the low voltage power.

The charger does not have one hundred percent efficiency in converting AC power from the electric grid to direct current (DC) power used in charging the battery and running the low voltage system. The amount of energy from the electric grid is given as:

$$E_{Total} = \frac{E_{HV} + E_{LV}}{\eta_{chg}} \quad (3)$$

where $E_{Total}$ is the total energy drawn from the electric grid and $\eta_{chg}$ is the efficiency of the charger. Note that the charger efficiency may vary as a function of the high voltage energy and low voltage energy. Additionally, the efficiency may increase as the power draw from the electric grid increases, or vice versa.

By minimizing the term ($E_{HV}+E_{LV}$) in equation (3), the lowest amount of energy will be used in the charging process.

Equation (3) may also be rearranged to account for the state of charge range of the battery as:

$$E_{Total} = \int_{SOC_i}^{SOC_f} (V_{HV} I_{HV} + P_{LV}) \frac{Q}{\eta_{chg} I_{HV}} dSOC \quad (4)$$

where Q is the capacity of the battery, usually measured in ampere-hours, SOC is the state of charge of the battery, and $SOC_i$ and $SOC_f$ are the initial and final values of the state of charge during the charging process.

The relationship for battery voltage is given as:

$$V_{HV} = V_{0,HV} + I_{HV} R_{HV} \quad (5)$$

where $R_{HV}$ is the resistance of the battery.

By substituting equation (5) into equation (4), the total amount of energy in charging is given as:

$$E_{Total} = \int_{SOCi}^{SOC_f} ((V_{0,HV} + I_{HV} R_{HV}) I_{HV} + P_{LV}) \frac{Q}{\eta_{chg} I_{HV}} dSOC \quad (6)$$

Where $V_{0,HV}$ is the open circuit voltage. Charge current (IHV) is a control parameter for the total amount of energy used in the charging process. Assuming a constant charger efficiency, the energy usage (at a given point) can be found by the following idealized relationship, which provides an optimal charge current as a function of low voltage power and high voltage battery resistance:

$$I_{HV} = \sqrt{\frac{P_{LV}}{R_{HV}}} \quad (7)$$

The optimal charge current in Equation (7) will change as the battery charges and the battery characteristics change. At higher states of charge, it may not be possible to charge at the "lowest energy" point due to damage that could be incurred to the battery cell. The charger may also not be able to provide enough power to charge at the optimal charge current, in which case the full charge power available will be used.

For example, if a vehicle has a battery with a resistance of 0.1 Ohm, a low voltage power of 100 Watts, and an open circuit battery voltage of 270 Volts; the optimum charge current would be 31.6 A based on equation (7). The battery power would be 8.64 kW, found by multiplying the current by the battery voltage (equation (5)).

If the low voltage power is changed to 50 Watts, the optimum charge current would change to 22.4 A, and the battery power would be 6.1 kW.

If the system had the battery with a resistance of 0.12 Ohm, a low voltage power of 50 Watts, and an open circuit battery voltage of 290 Volts (higher state of charge than before); the optimum charge current would be 20.4 A and the battery power would be 6.0 kW.

The relationship given in equation (7) applies exactly as shown only when the battery voltage is described by the model given in equation (5). Of course, a battery may have a more complex voltage model and it is contemplated that the optimal current relationship in equation (7) would need to be modified accordingly to accommodate the battery voltage model. For a battery with a more complex voltage model, the resulting optimal current is generally close in value to the current given by equation (7). In other words, equation (7) gives an approximation of the optimal current for batteries with more complex voltage models, and equation (7) may be modified to provide an exact optimal current value using the complex voltage model.

The method above determined the optimal charging rate based on a generally constant low voltage usage. If the cooling system for the battery is off during charging (the lowest energy state), then consideration must be given to keeping the system off. Assuming an adiabatic system if the cooling system is off, the first step would be to estimate the end temperature of the battery:

$$T_{final} = T_{init} + \int \frac{I^2 R}{C_p} dt + \int Q_{rxn} \qquad (8)$$

where $T_{final}$ is the final temperature of the battery, $T_{init}$ is the initial temperature of the battery, I is the battery current, R is the battery resistance, $C_p$ is the specific heat, and $Q_{rxn}$ is the heat generated through the reaction. The ohmic term generally predominates. If the battery charge current is reduced, then the temperature rise of the battery will also be reduced. If the battery thermal management loads for the cooling system are significant, it may be desirable to lower the charge current in certain cases to keep the battery below the turn-on temperature for the cooling system.

Additionally, towards the end of the charging process for the battery at a high state of charge, the charge current tends to be limited by what the battery can safely accept, which is given by:

$$E_{tot} = E_{HV} + E_{LV} + E_{CHG} \qquad (9)$$

The user interface may be through the wall unit, a vehicle information display system, or a remote device in communication with one of the two. The remote device could be a cellular phone or a computer with a web-based application for example. A user may select various charging options, including: fastest, least expensive, "start at", "finish by", and "lowest energy consumption". In one embodiment, the lowest energy consumption is the default option for the charging system unless it is overridden by another selection by the user, which would mean a user choosing to charge at a rate that uses more energy. A charging system for a vehicle may also be configured to "lock in" or "lock out" certain options, which may be of interest for fleet customers for example.

Some electric or hybrid vehicles have a "pre-heat" or "pre-cool" feature which uses electric grid power to heat or cool the vehicle cabin shortly prior to the user using the vehicle, which avoids using battery energy for heating or cooling the cabin and saves it for vehicle propulsion. The pre-heat and pre-cool may be pre-programmed by the user. When pre-heat, pre-cool, or other similar features are operating, charging the battery may already be complete. If charging is not complete, the power required to pre-heat or pre-cool is factored into the "low voltage power" portion of equation (6) or (7), even if the heater is high voltage. Other high voltage devices may also need to be factored into the low voltage power, such as a DC/DC converter, if they are operating during charging.

The optimal charge current for minimum energy consumption may be combined with knowledge of electric rates to provide an improved "least expensive" charge option.

The minimum energy consumption may also be used when examining alternatives in charger design. For example, Table 1 below compares a 3.3 kW charger and a 6.6 kW charger, each about 90% efficient, and therefore providing 3 kW or 6 kW, respectively, to the vehicle. The battery properties are 0.1 Ohm resistance, 100 Watts of low voltage power, 270V open circuit battery voltage, thereby providing a 31.6 A optimum charge current and a 8.64 kW optimum battery power.

TABLE 1

| Parameter | Optimal Charge current | Maximum - 3.3 kW charger | Maximum - 6.6 kW Charger | Reference: 1.4 kW Charger |
|---|---|---|---|---|
| Charger Current | 31.6 A | 10.7 A | 21.7 A | 4.4 A |
| Vehicle Power | 8.74 kW | 3.0 kW | 6.0 kW | 1.3 kW |
| Energy Penalty | 0 | 1.5% | 0.2% | 6.1% |

In this case, the implementer would decide whether the 1.3% energy savings (and charge time savings) is worth the cost of the larger charger.

If a charger implementation requests charger power instead of current, the above equations hold, and the charger power request is adjusted such the charge current is optimized. Other methods of requesting current/power from the charger (such as a duty cycle request) work in the same manner.

The charge current from the charger may be adjusted to minimize the energy needed from the electric grid to charge a high voltage battery in a battery electric, plug-in hybrid, or fuel cell electric vehicle.

The minimization of energy to charge is based on minimizing the combination of the voltage (IR) losses on the high voltage battery, low voltage consumption of the vehicle system, and any high voltage auxiliary loads. The avoidance of loads may also be considered such as charging at a lower rate to avoid the need to turn on a battery cooling system, for example.

The minimum energy optimization may be performed whether the charger is on-board or off-board the vehicle.

The minimum energy optimization may be modified to account for other vehicle loads.

A vehicle may include charging options to allow the user to select fastest charging, minimum energy charging, or lowest cost charging. The charging options can also include time constraints such as "lowest energy or lowest cost to complete by a given time", "finish by" charging or "cheapest rate" charging. The default option may be set as the minimum energy consumption option.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:

1. A method for charging a battery in one of a hybrid vehicle and an electric vehicle comprising:
   calculating an amount of energy consumption for charging a battery by taking the sum of a first amount of energy for charging a high voltage battery and a second amount of energy for use by a low voltage auxiliary system during charging;

determining an optimal charge current for a charger based on a charging option, the charging option providing a set of desired charging parameters for a charger controller;

determining a state of charge of the battery within a state of charge range; and controlling the charger using the charger controller to provide a charge current to the battery, wherein the charge current is the optimal charge current up to a maximum charge current for the state of charge range of the battery.

2. The method of claim 1 wherein the charging option is a minimum energy consumption charge.

3. The method of claim 1 further comprising providing a user input to select the charging option for the battery.

4. The method of claim 3 wherein the charge option comprises at least two of a minimum energy consumption charge, a fast charge, an economical charge, a "start at" charge, and a "finish by" charge.

5. The method of claim 1 wherein the amount of energy consumption, $E_{Total}$, for charging a battery is determined using:

$$E_{Total} = \int_{SOC_i}^{SOC_f} ((V_{O,HV} + I_{HV} R_{HV})I_{HV} + P_{LV}) \frac{Q}{\eta_{charger} I_{HV}} dSOC$$

where $V_{O,HV}$ is the open circuit voltage, $I_{HV}$ is the current from the charger, $R_{HV}$ is the resistance of the battery, $P_{LV}$ is the power of the auxiliary system, Q is the capacity of the battery, $\eta_{charger}$ is the efficiency of the charger, and SOC is the state of charge of the battery.

6. The method of claim 1 wherein the charge current to minimize energy consumption is generally defined by:

$$I_{HV} = \sqrt{\frac{P_{LV}}{R_{HV}}}$$

where $I_{HV}$ is the current from the charger, $P_{LV}$ is the power of the low voltage auxiliary system, and $R_{HV}$ is the resistance of the high voltage battery.

7. The method of claim 2 wherein the charger efficiency is approximately constant.

8. The method of claim 1 wherein the low voltage auxiliary system includes a cooling system for the battery;
the method further comprising:
determining if the cooling system for the battery is on or off during charging;
estimating the temperature of the battery at the end of a charging time interval if the cooling system is off; and
lowering the charge current such that the battery remains below a maximum battery temperature.

9. The method of claim 1 wherein the low voltage auxiliary system includes at least one of a controller, a vehicle data display, a vehicle gauge, and an HVAC system to condition the air in the vehicle prior to use; and
the method further comprises adjusting the charge current to provide for an additional draw by the low voltage auxiliary system.

10. The method of claim 1 further comprising:
determining an amount of energy for use by a high voltage auxiliary system; and
adjusting the charge current to provide for an additional draw by the high voltage auxiliary system.

11. The method of claim 10 wherein the high voltage auxiliary system includes a cooling system for at least one of a charger and the high voltage battery.

12. A battery charging system for an electrically powered vehicle having a rechargeable high voltage battery, the system comprising:
a battery charger adapted to provide a charge current to the battery; and
a battery controller configured to command battery charging at an optimal charge current based on low voltage power of the auxiliary system and resistance of the battery and representing a minimized amount of energy consumption to operate an auxiliary system while charging the battery.

13. The battery charging system of claim 12 wherein the optimal charge current is generally defined by:

$$I_{HV} = \sqrt{\frac{P_{LV}}{R_{HV}}}$$

where $I_{HV}$ is the high voltage current from the charger, $P_{LV}$ is the low voltage power of the auxiliary system, and $R_{HV}$ is the resistance of the high voltage battery.

14. The battery charging system of claim 12 wherein the battery controller determines a state of charge of the battery within a state of charge range; and
wherein the charge current provided by the charger to the battery is the optimal charge current up to a maximum charge current for the state of charge range of the battery.

15. The battery charging system of claim 12 wherein the battery charger is on-board the vehicle.

16. The battery charging system of claim 12 wherein the battery charger is at a charging station located off-board the vehicle.

17. The battery charging system of claim 12 wherein the battery charger is designed to receive approximately 240 volts from the external power source.

18. The battery charging system of claim 12 wherein the auxiliary system further comprises a cooling system for the battery.

19. The battery charging system of claim 12 further comprising a user interface connected to the charger and the battery controller, the user interface being configured to allow a user to select a charging option for the battery, the charging option providing a set of desired charging parameters for the battery controller.

20. The battery charging system of claim 19 wherein the charging option comprises at least two of a lowest energy consumption charge, a fast charge, an economical charge, an "start at" charge, and a "finish by" charge.

21. A method for charging a vehicle battery comprising:
calculating an optimal charge current generally defined by $$I_{HV} = \sqrt{\frac{P_{LV}}{R_{HV}}}$$

to minimize the amount of energy consumption by a battery, where $I_{HV}$, is the current from the charger, $P_{LV}$ is the power of the low voltage auxiliary system, and $R_{HV}$, is the resistance of the high voltage battery; and charging the battery at the optimal charge current up to a maximum charge current for the battery.

* * * * *